US010632452B2

(12) United States Patent
Granovsky et al.

(10) Patent No.: US 10,632,452 B2
(45) Date of Patent: Apr. 28, 2020

(54) METHOD OF MANUFACTURING A SORBENT MATERIAL

(71) Applicant: GREEN OCEAN MALTA LIMITED, San Gwann (MT)

(72) Inventors: Shai Granovsky, Moscow (RU); Leonid Urievich Tsybulya, Hipha (IL); Vadim Urievich Manov, Hipha (IL)

(73) Assignee: GREEN OCEAN MALTA LIMITED, San Gwann (MT)

( * ) Notice: Subject to any disclaimer, the term of this patent is extended or adjusted under 35 U.S.C. 154(b) by 308 days.

(21) Appl. No.: 15/553,455

(22) PCT Filed: Feb. 19, 2016

(86) PCT No.: PCT/RU2016/000091
§ 371 (c)(1),
(2) Date: Aug. 24, 2017

(87) PCT Pub. No.: WO2016/140594
PCT Pub. Date: Sep. 9, 2016

(65) Prior Publication Data
US 2018/0133690 A1    May 17, 2018

(30) Foreign Application Priority Data
Mar. 2, 2015  (RU) ................................ 2015106884

(51) Int. Cl.
| | | |
|---|---|---|
| *B01J 20/30* | (2006.01) | |
| *B01D 53/04* | (2006.01) | |
| *B01J 20/28* | (2006.01) | |
| *B01J 20/32* | (2006.01) | |
| *B01J 20/16* | (2006.01) | |

(52) U.S. Cl.
CPC .......... *B01J 20/3085* (2013.01); *B01D 53/04* (2013.01); *B01J 20/16* (2013.01); *B01J 20/28* (2013.01); *B01J 20/28004* (2013.01); *B01J 20/28011* (2013.01); *B01J 20/28023* (2013.01); *B01J 20/28028* (2013.01); *B01J 20/30* (2013.01); *B01J 20/3236* (2013.01); *B01J 2220/4806* (2013.01)

(58) Field of Classification Search
CPC ................ B01J 20/3085; B01J 20/3236; B01J 20/28028; B01J 20/28023; B01J 20/28011; B01J 20/28004; B01J 2220/4806; B01J 20/30; B01J 20/28; B01J 20/16; B01D 53/04
See application file for complete search history.

(56) References Cited

U.S. PATENT DOCUMENTS

| | | |
|---|---|---|
| 8,785,347 B2 | 7/2014 | Belisle |
| 2004/0038608 A1 | 2/2004 | Shaw et al. |

FOREIGN PATENT DOCUMENTS

| | | | |
|---|---|---|---|
| KR | 2001-0037511 A | | 5/2001 |
| RU | 2 197 321 C1 | | 1/2003 |
| RU | 2 209 724 C1 | | 8/2003 |
| RU | 2 361 661 C2 | | 7/2009 |
| RU | 2361661 C2 | * | 7/2009 |
| SU | 1030319 A | | 7/1983 |
| SU | 1030319 A1 | * | 7/1983 |
| SU | 1673204 A1 | | 8/1991 |

OTHER PUBLICATIONS

Extended European Search Report dated Jul. 30, 2018 in European Patent Application No. 16759205.4, 5 pages.
International Search Report dated Jun. 23, 2016, in PCT/RU2016/000091 filed Feb. 19, 2016.
Search Report dated Sep. 16, 2015 in Russian Patent Application No. 2015106884 (with English language translation).
E.E. Sirotkina, et al. "Materials for Adsorption Purification of Water to Remove Petroleum and Petroleum Products", Chemistry for Stable Development, vol. 13, 2005, pp. 359-377.

* cited by examiner

*Primary Examiner* — Amber R Orlando
*Assistant Examiner* — Syed T Iqbal
(74) *Attorney, Agent, or Firm* — Oblon, McClelland, Maier & Neustadt, L.L.P.

(57) ABSTRACT

The invention relates to the field of cleaning the environment, and more particularly to a sorbent material for collecting petroleum and petroleum products, and to a method of producing the same. The method includes saturating a basalt fiber canvas with a hydrophobizing liquid and subsequently drying the same, wherein the basalt fibers of the canvas have a diameter of 0.2-2 microns and a density not exceeding 20-25 kg/m$^3$; prior to saturation, the canvas is first fluffed using compressed air until a density of 12-15 kg/m$^3$ is reached; the saturation using a hydrophobizing liquid is performed by introducing the hydrophobizing liquid into the pre-fluffed basalt fibers of the canvas in the form of aerosol particles via compressed air; and the subsequent drying of the saturated canvas is performed using compressed air, preferably at a temperature of 65° C.-75° C. The technical effect of invention is a simplified method with a broader field of application. The material manufactured in accordance with this method is characterized in that the volume of hydrophobizing additive is selected in order to achieve a density of the finished material which is in the range of 10-70 kg/m$^3$, or in the range of 10-15 kg/m$^3$, in the range of 30-70 kg/m$^3$. This improves the sorbent characteristics of the material.

7 Claims, No Drawings

METHOD OF MANUFACTURING A SORBENT MATERIAL

This application is a National Stage entry under 35 U.S.C § 371 of PCT/RU2016/000091, filed on Feb. 19, 2016, and claims priority to Russian Patent Application No. 2015106884, filed on Mar. 2, 2015.

TECHNICAL FIELD OF INVENTION

The invention relates to the field of cleaning the environment, more particularly to a sorbent material for collecting petroleum and petroleum products and to a method of producing the same. The invention may be useful predominantly for cleaning the contaminated water surface to remove petroleum and petroleum products.

BACKGROUND ART

The prior art knows a method of manufacturing a sorbent material [RU 2007126986, A, B01J 20/20, B01J 20/26, 27 Jan. 2009], offering the steps of forming a layer of thermoplastic polymeric fibers, subjecting it to the treatment with an agent having hydrophobic characteristics, and performing the heat treatment of a material in order to ensure thermal bonding of the fibers, wherein dispersed carbon is used as the agent having hydrophobic characteristics, and the heat treatment is performed for bonding the carbon onto a surface of the fibers, thereafter unbonded carbon particles are removed.

The disadvantage of the known method is its being relatively highly complex. Also, the prior art knows a method of manufacturing a sorbent material for removal of petroleum and petroleum products from aqueous solutions and separation of stable oil-water emulsions [RU 2361661, C2, B01J 20/26, B01D17/022, 20 Jul. 2009] offering the steps of growing a substrate layer in the form of polymeric fibers, consolidating the substrate thermomechanically, producing therefrom a spatially corrugated fabric to be exposed to heat setting at a temperature of 90-120° C., forming layers of ultrafine hydrophilic fiber, superimposing said layers, causing interlayer bonding to occur, and holding the layers for 1-2 hours in an electrolyte solution.

The disadvantages of the known method are its being relatively highly complex and its being relatively unsafe because of use of electrolyte.

The prior art also knows the technical solution [RU 2197321, C1, B01J20/28, C02F1/28, 27 Jan. 2003] which is based on the point that a sorbent material for removal of petroleum and petroleum products is produced by forming alternating layers of a fibrous base saturated with an active agent from the class of alkylcarboxylic acids and a hydrophobisator from the class of aliphatic esters of alkylcarboxylic acids, elements made of a water-shrinkable fibrous material, a layer of reinforcing elements, wherein heat and steam resistant elements configured in the form of bundles or strips of basalt fabric having specific surface area of 200-700 m²/kg are disposed on an outer surface of the sorbent, said fibrous base is made of basalt fibers having a diameter of 0.2-2.0 microns and specific surface are is 700-1400 m²/kg, said reinforcing elements and antishrinking elements are made of basalt fabric, the sorbent comprising the following components, wt. %:

| | |
|---|---|
| Active agent | 1.0-5.0 |
| Hydrophobisator | 1.0-5.0 |
| Basalt fibrous base having specific surface area of 700-1400 m²/kg | 70-93.0 |
| Reinforcing elements | 1.0-5.0 |
| Antishrinking elements | 3.0-5.0 |
| Heat and steam resistant elements | 1.0-10.0 |

The disadvantages of this technical solution known from the prior art are its relatively high complexity and narrow application field since a material manufactured in accordance with this particular method offers relatively low sorption capacity.

Indeed, according to the invention, in the event of using hydrophobized basalt fibers having specific surface area of 700-1400 m²/kg (or having a diameter of 0.2-2 microns) as the main sorbent component of a material for cleaning water surface to eliminate spills of petroleum and petroleum products it is possible to achieve sorption capacity of a product within the range of 42-46. Such relatively low sorption capacity of a material comes from the point that an influence of basalt fibrous material structure on sorption capacity is overlooked in case of cleaning water surface to remove spills of petroleum and petroleum products.

In terms of the technical nature, the prior art method which may regarded to be the closest to the claimed one is a method [SU 1030319, A1, C02F1/40, C02F1/28, C02F103:34, 23 Jul. 1983] which describes different variants of producing a sorbent for removal of petroleum and petroleum products from water surface, said sorbent being made on the basis of basalt fiber and hydrophobizing additive at the following ratio of components, wt. %:basalt fibers 85-98, hydrophobizing additive 2-15. In accordance with this method, in case of producing such material, a hydrophobizing additive is applied onto a surface of basalt fibers by means of holding the fibers and the liquid hydrophobizing organic silicon compound (additive) in hermetically sealed space at room temperature and shaking for 60 minutes or at a temperature of 200° C. and shaking for 20 minutes.

Implementation of the known method is very time and power consuming objective which makes virtually impossible an option of large-scale and highly effective production of a sorbent material and articles to be made of such material.

Besides, although use of liquid organic silicon compounds ensures, on the one hand, more uniform and full saturation of elementary basalt fibers of the canvas, but nevertheless full saturation of the canvas with the hydrophobizing liquid tends to increase, on the other hand, a density of the canvas up to 80-120 kg/m³ due to capillary force effect. This reduces, in its turn, a size of interfibrillar voids in the material (canvas), thus blocking the possibility of full-fledged utilization of high sorption capacity of basalt fibers towards petroleum and petroleum products.

Therefore, a drawback of the closest technical solution (relevant to the claimed method) known from the prior art is relatively high complexity and relatively narrow application field since a material manufactured in accordance with the claimed method offers relatively low sorption capacity.

The prior art also knows materials useful for the manufacture of products designed for collection of petroleum and petroleum products.

Thus, the prior art knows a material [RU 2007126986, A, B01J 20/20, B01J 20/26, 27 Jan. 2009] comprising a layer of thermoplastic polymeric fibers, said fibers being bound to each other, and a hydrophobic substance bound to said fibers, the hydrophobic substance being dispersed carbon whose particles are 50-1000 Angstroms in size, wherein a share the dispersed carbon bound to the fibers ranges from 1 to 25% of the fiber weight, and the layer of said thermoplastic polymeric fibers is a woven or non-woven fabric.

The disadvantage of the known material is that it offers low sorbent characteristics.

Yet another material known from the prior art is a material for removal of petroleum and petroleum products from an aqueous solution and for separation of stable oil-in-water emulsions [RU 2361661, C2, B01J, 20/26, B01D 17/022, 20 Jul. 2009], comprising a layer of spatially corrugated non-woven fabric made of polymeric fibers having hydrophobic surface and also a layer of ultrafine hydrophilic fibers whose dielectric capacity is at least 1.45 units greater than dielectric capacity of the above-said layer of polymeric fibers having hydrophobic surface, wherein as said ultrafine hydrophilic fibers the material comprises glass, basalt or metallic fibers having a diameter of 1-15 micrometers or a combination of said fibers, and weight ratio of the layer of polymeric fibers having hydrophobic surface to the layer of ultrafine hydrophilic fibers is (2-10):1.

The disadvantage of known material is that it offers relatively low sorbent characteristics.

The technical solution which is the closest, in terms of its technical nature, to the claimed material designed for collecting petroleum and petroleum products is a material based on inorganic fibrous material and a hydrophobizing additive [SU 1030319, A1, C02F 1/40, C02F 1/28, C02F103:34, 23 Jul. 1983], wherein basalt fibers are used as inorganic fibrous material, said basalt fibers having the following proportion of components, wt. %: basalt fibers—85-98, hydrophobizing additive—2-15.

The disadvantage of known material is that it offers relatively low sorbent characteristics.

The reason behind this disadvantage is that sorption capacity parameters of a material produced by means of using solid hydrophobizing materials are much lower than that of a similar material produced as a result of using liquid organic silicon compounds. This comes from the point that canvas made of superfine and ultrafine basalt fibers is a matrix consisting of elementary fibers intertwined densely enough that have a diameter up to 2-3 microns and a length of 10-30 mm. Due to surface filtration, the original dense enough matrix of basalt fibers creates problems for both uniform coating of each elementary fiber with a solid hydrophobizing material and saturation with liquid organic silicon compounds. Besides, although use of liquid organic silicon compounds could ensure, on the one hand, more uniform and full saturation of elementary basalt fibers in the canvas, but nevertheless a full saturation of the canvas with the hydrophobizing liquid tends to increase, on the other hand, a density of the canvas up to 80-120 kg/m$^3$ due to capillary force effect. This reduces, in its turn, a size of interfibrillar voids in the material (canvas), thus blocking the possibility of full-fledged utilization of high sorption capacity of basalt fibers towards petroleum and petroleum products.

DISCLOSURE OF INVENTION

An objective to be gained by claimed method is simplification of the method per se and broadening of application field for said method due to providing for the possibility of the manufacture of a material having high sorption capacity.

The objective posed is gained and technical effect of the invention is achieved due to the point that in a method of manufacturing a material for collecting petroleum and petroleum products, comprising the step of saturating a basalt fiber canvas with a hydrophobizing liquid and subsequently drying the same, according to the invention for method, the basalt fibers having a diameter of 0.2-2 microns and a density not exceeding 20-25 kg/m$^3$ are used as the basalt fibers of the canvas, the canvas is first fluffed, prior to saturation, using compressed air until a density of 12-15 kg/m$^3$ is reached, the saturation with a hydrophobizing liquid is performed by introducing the hydrophobizing liquid into the pre-fluffed basalt fibers of the canvas in the form of aerosol particles via compressed air, and the subsequent drying of the saturated canvas is performed using compressed air.

In addition, technical effect of the invention is achieved due to the point that the subsequent drying of the saturated canvas using compressed air is performed at a temperature of 65° C.-75° C.

Moreover, technical effect of the invention is achieved due to the point that the volume of hydrophobizing additive for introducing thereof using compressed air into the pre-fluffed basalt fibers, which is followed by the subsequent drying, is selected in order to satisfy the condition of achieving a density of the finished material up to 10 kg/m$^3$.

Furthermore, technical effect of the invention is achieved due to the point that the subsequent drying of the pre-fluffed and saturated basalt fibers of the canvas using the flow of compressed air is performed in their suspension, which is followed by deposition of the fibers onto a mesh of metal and by mechanical consolidation of the same in order to achieve a density of the finished material either within the range of 10-70 kg/m$^3$, or within the range of 10-15 kg/m$^3$, or within the range of 30 to 70 kg/m$^3$.

Besides, the objective to be gained by the claimed invention with regard to a material for articles used for collecting petroleum and petroleum products is to enhance sorbent characteristics of said material.

Technical effect of the invention to be achieved is enhancement of sorbent characteristics.

The objective posed is gained and technical effect of the invention is achieved due to the point that a material for articles used for collecting petroleum and petroleum products, said material being manufactured according to the method of claim 1, being made of basalt fibers, and comprising a hydrophobizing additive, according to the invention, is a canvas of basalt fibers having a diameter of 0.2-2 microns and a density not exceeding 20-25 kg/m$^3$, which is pre-fluffed first using compressed air to achieve a density of 12-15 kg/m$^3$, and the hydrophobizing additive is contained in the material in the form of a saturation of the fluffed canvas by aerosol particles of a liquid hydrophobizing agent, said saturation being followed by subsequent drying using compressed air, wherein the volume of hydrophobizing additive is selected in order to satisfy the condition of achieving a density of the finished material either within the range of 10-70 kg/m$^3$, or within the range of 10-15 kg/m$^3$, or within the range of 30 to 70 kg/m$^3$.

In addition, technical effect of the invention with regard to a material is achieved due to the point that said material comprises a canvas of basalt fibers that are fluffed and saturated first, then subjected to subsequent drying using the flow of compressed air in their suspension, which is followed by further deposition of the fibers onto a mesh of metal and by mechanical consolidation of the same in order to achieve the required density of the finished material.

Moreover, technical effect of the invention with regard to a material is achieved due to the point that the material comprises a canvas of basalt fibers that are fluffed and saturated first, then subjected to subsequent drying in the form of pre-fluffed and saturated basalt fibers at a temperature of 65° C.-75° C.

The posed objective of enhancement of the performance of articles made of a material manufactured by the claimed method is solved by differentiation of density of the material in the articles depending on specific characteristics of using said articles.

EMBODIMENTS OF INVENTION

Since absorbent pillows and absorbent mats useful to remove petroleum and petroleum product spills from water surface are used by means of deployment on a surface of such spills, density of adsorbent material is supposed to be within the range of 10 to 15 kg/m$^3$. In addition, a shell of these articles may be manufactured using fibrous materials, including meshes, fabrics or non-woven materials or a combination thereof that should provide unhindered access of petroleum or petroleum product to adsorbent material.

The structure of internal voids of a material based on fibers of basalt rock formations having a density of 10 to 15 kg/m$^3$ provide for sorption capacity of an article within the range of 140 to 150, which is greater by 30% than the similar characteristics of known materials and articles.

Optimal solution in case of the manufacture of oil-spill booms is use of a material based on fibers of basalt rock formations, which may be produced by the above-described method in order to achieve a density of the material within the range of 30 to 70 kg/m$^3$. A shell for oil-spill booms is made of meshes, fabrics or non-woven materials or a combination thereof that should provide unhindered access of petroleum or petroleum product to adsorbent material. This particular structure of the oil-spill boom offers sorption capacity of such articles within the range of 120 to 130, which is greater by 10-15% than the similar characteristics of known materials and articles.

In addition, a reduction of oil-spill boom material density below 30 kg/m$^3$ opens up the possibility of infiltration of water in an amount of 5 to 10 wt. % inside the oil-spill boom at the time from the beginning of oil-spill boom deployment on water surface to contact with spilled petroleum or petroleum product. This option results in reduced sorption capacity of the oil-spill boom and it requires further refining of petroleum (petroleum product) after removal thereof from the oil-spill boom.

An increase in density of adsorbent material of oil-spill boom up to 70 kg/m$^3$ or greater leads to physical damage of fibers. As a result of excessive consolidation, many fibers become broken and an average length of the fibers reduces, thus adversely affecting the strength of the matrix comprising densely intertwined fibers and creating problems relating to retention of absorbed petroleum (petroleum product) inside the oil-spill boom, especially under storm sea conditions.

A method of manufacturing a sorbent material which is useful for collecting petroleum and petroleum products is realized as follows.

Example 1

A canvas of basalt superfine fibers having an average thickness fiber diameter of 2.0 microns and an average density of 25 kg/m$^3$ had been fluffed using compressed air until an average density of 12 kg/m$^3$. Further, the canvas was remaining under the treatment by compressed air with inclusion of aerosol particles of organic silicon hydrophobizing liquid. In addition, upon completion of such treatment, a density of the canvas saturated with the hydrophobizing liquid was about 8 kg/m$^3$. Then, the canvas was exposed to drying using compressed air having a temperature of 70° C. As a result, post-drying density of the canvas was 10 kg/m$^3$. The material thus produced offered the sorption capacity of 160 with regard to raw petroleum having a density of 0.85 g/cm$^3$.

Example 2

A canvas of basalt ultrafine fibers having an average thickness fiber diameter of 1.6 microns and an average density of 20 kg/m$^3$ had been fluffed using compressed air until an average density of 12 kg/m$^3$. Further, the canvas was remaining under the treatment by compressed air with inclusion of aerosol particles of organic silicon hydrophobizing liquid. Then, the canvas was exposed to drying using compressed air having a temperature of 70° C. As a result, post-drying density of the canvas was 10 kg/m$^3$. The material thus produced offered the sorption capacity of 170 with regard to raw petroleum having a density of 0.85 g/cm$^3$.

Example 3

An article, which is a petroleum or petroleum product spill collection pillow having a total sorption surface area of 1 m$^2$, was manufactured as follows. Originally, a pillow shell was made of a non-woven material based on polypropylene fibers having a surface density of 50+/−5 g/m$^2$. Further, a material manufactured according to Example 1 was placed into the shell. Density of the finished article was 10 kg/m$^3$. The pillow thus produced offered the sorption capacity of 140 with regard to raw petroleum having a density of 0.85 g/cm$^3$.

Example 4

An article, which is a barrier web for collecting petroleum or petroleum products, said web having a total sorption surface area of 1 m$^2$, was manufactured as follows. Originally, a mat shell was made of a non-woven material based on polypropylene fibers having a surface density of 50+/−5 g/m$^2$. Further, a material manufactured according to Example 2 was placed into the mat shell. Density of the finished article was 15 kg/m$^3$. The barrier web thus produced offered the sorption capacity of 150 with regard to raw petroleum having a density of 0.85 g/cm$^3$.

Example 5

An article, which is a petroleum-spill boom for collecting petroleum or petroleum products, said boom having a diameter of 150 mm and a length of 3.0 m was manufactured as follows. Originally, a boom shell was made of a non-woven material based on polypropylene fibers having a surface density of 50+/−5 g/m$^2$. Further, a material manufactured according to Example 1 and consolidated mechanically was placed into the boom shell. As a result, a density of the articles thus produced was not exceeding 20, 30, 70 and 80 kg/m$^3$. The table below shows the data on sorption capacity of said booms with regard to raw petroleum having a density of 0.85 g/cm³, and also the data on moisture content in adsorbent material after being held in sea water for 30 minutes.

TABLE

| Specimen No. | Article density, kg/m³ | Moisture content, wt. % | Sorption capacity, units | Notes |
|---|---|---|---|---|
| 1 | 20 | 8% | 90 | |
| 2 | 30 | less than 1% | 130 | |
| 3 | 70 | less than 1% | 120 | |
| 4 | 80 | less than 1% | 100 | Leakage losses |

The table data reveal that suggested density values for a material useful for collecting petroleum or petroleum products are optimal for manufactured articles in view of specific conditions of their application.

Therefore, owing to improvement of the known method and use of new operations (in particular, due to the point that prior to saturation a canvas of basalt fibers, which uses fibers having a diameter of 0.2-2 microns and a density not exceeding 20-25 kg/m³ are as the basalt fibers of the canvas, the canvas is first fluffed, using compressed air until a density of 12-15 kg/m³ is reached, the saturation with a hydrophobizing liquid is performed by introducing the hydrophobizing liquid into the pre-fluffed basalt fibers of the canvas in the form of aerosol particles via compressed air, and the subsequent drying of the saturated canvas is performed using compressed air), the required technical effect comprising the method simplification and broadening the application field thereof is achieved.

In addition, owing to improvement of the known material (said material being a canvas of basalt fibers having a diameter of 0.2-2 microns and a density not exceeding 20-25 kg/m³, which is pre-fluffed first using compressed air to achieve a density of 12-15 kg/m³, and the hydrophobizing additive is contained in the material in the form of a saturation of the fluffed canvas by aerosol particles of a liquid hydrophobizing agent, said saturation being followed by subsequent drying using compressed air at a temperature of 65° C.-75° C., wherein the volume of hydrophobizing additive is selected in order to satisfy the condition of achieving a density of the finished material either within the range of 10-70 kg/m³, or within the range of 10-15 kg/m³, or within the range of 30 to 70 kg/m³), the required technical effect with regard to the material is achieved since sorbent characteristics of said material are improved.

INDUSTRIAL APPLICABILITY

All industrial equipment used for realization of inventive method of manufacturing a sorbent material for collecting petroleum and petroleum products belongs to well known and widely applied pieces of equipment used in chemical industry. Inventive sorbent material is produced on the basis of commercially available and widely used components. Used as such are canvases made of basalt fibers, organic silicon hydrophobizing liquid useful for saturation. Therefore, the inventions claimed are industrially applicable.

The invention claimed is:

1. A method of manufacturing a sorbent material, the method comprising:
   saturating a basalt fiber canvas with a hydrophobizing liquid, thereby obtaining a saturated basalt fiber canvas, and
   subsequently drying the saturated basalt fiber canvas, thereby obtaining a sorbent material suitable for collecting petroleum and/or a petroleum product,
   wherein
   the basalt fiber canvas comprises basalt fibers having a diameter of from 0.2 to 2 microns and a density 25 kg/m³ or less,
   the basalt fiber of the basalt fiber canvas is first fluffed, prior to saturation, with compressed air, thereby obtaining a density of from 12 to 15 kg/m³,
   the saturating of the basalt fiber canvas with the hydrophobizing liquid comprises introducing the hydrophobizing liquid in the form of aerosol particles via compressed air after the fluffing of the basalt fibers of the canvas, and
   the subsequent drying of the saturated basalt fiber canvas is with compressed air.

2. The method of claim 1, wherein the subsequent drying of the saturated basalt fiber canvas with compressed air is at a temperature of from 65° C. to 75° C.

3. The method of claim 1, wherein a volume of the hydrophobizing liquid introduced with compressed air into the basalt fibers after the fluffing is selected such that a density of the sorbent material is 10 kg/m³ or less.

4. The method of claim 1, wherein the subsequent drying of the pre-fluffed and saturated basalt fibers of the canvas with a flow of compressed air is performed in suspension, which is followed by deposition of the basalt fibers onto a mesh of a metal and by mechanical consolidation such that a density of the sorbent material is from 10 to 70 kg/m³.

5. A material manufactured by the method of claim 1, the material comprising:
   a hydrophobizing additive,
   a basalt fiber canvas comprising basalt fibers having a diameter of from 0.2 to 2 microns and a density 25 kg/m³ or less, which is pre-fluffed first using compressed air to achieve a density of from 12 to 15 kg/m³,
   wherein the hydrophobizing additive is contained in the material in the form of a saturation of the fluffed basalt fiber canvas by aerosol particles of a liquid hydrophobizing agent, said saturation being followed by subsequent drying using compressed air, and
   wherein a volume of the hydrophobizing additive is such that a density of the manufactured material of from 10 to 70 kg/m³.

6. The material of claim 5, wherein the basalt fibers of the canvas are fluffed and saturated first, then subjected to subsequent drying with a flow of compressed air in suspension, which is followed by further deposition of the basalt fibers onto a mesh of a metal and by mechanical consolidation such that the density of the manufactured material is from 10 to 70 kg/m³.

7. The material of claim 5, wherein the basalt fibers of the canvas are fluffed and saturated first, then subjected to subsequent drying in the form of basalt fibers at a temperature of from 65° C. to 75° C.

* * * * *